United States Patent [19]

Rovati et al.

[11] Patent Number: 4,590,375
[45] Date of Patent: May 20, 1986

[54] APPARATUS FOR DETECTION OF AN ENEMY'S INFRARED CAMERA

[75] Inventors: Philippe Rovati, Bretigny sur Orge; Claude Jourdain, Morsang sur Orge; Olivier de Witte, Gif sur Yvette, all of France

[73] Assignee: Compagnie Industrielle des Lasers Cilas Alcatel, Marcoussis, France

[21] Appl. No.: 614,906

[22] Filed: May 29, 1984

[30] Foreign Application Priority Data

May 31, 1983 [FR] France ................. 83 08968

[51] Int. Cl.$^4$ ............ G02F 1/29; G01J 5/10; G01S 17/74
[52] U.S. Cl. .................... 250/348; 250/330; 250/341; 250/338
[58] Field of Search ............ 250/347, 330, 334, 341, 250/348, 338, 342, 203 CT; 89/1.11, 41.06; 343/18 E

[56] References Cited

U.S. PATENT DOCUMENTS

| | | | |
|---|---|---|---|
| 2,989,744 | 6/1961 | Pettit | 343/18 E |
| 3,891,989 | 6/1975 | Barney et al. | 343/18 E |
| 3,946,233 | 3/1976 | Erben et al. | 250/347 |
| 4,112,300 | 9/1978 | Hall, Jr. | 250/330 |
| 4,286,498 | 9/1981 | Block et al. | 343/18 E |

FOREIGN PATENT DOCUMENTS 2318429 2/1977 France.
2505505 11/1982 France.

Primary Examiner—Carolyn E. Fields
Attorney, Agent, or Firm—Sughrue, Mion, Zinn, Macpeak & Seas

[57] ABSTRACT

Apparatus for the detection of an enemy infrared camera. This apparatus includes a continuous infrared laser 1 directed towards camera 25, a receiver 10 of the infrared signals sent by the camera, a processing circuit 23 of these signals, able to determine a delay time, a delay circuit 22 supplying electrical signals delayed by the said delay time in relation to the reception of infrared signals, and a pulsed laser 16 sending to camera 25 laser pulses respectively on reception of the delayed signals. The apparatus causes a very bright spot to be created on the camera screen which represents a picture of a dummy object displaced by a predetermined distance from the apparatus. This spot overshadows the spot on the screen corresponding to the true location of the apparatus.

Application is for detection of an enemy infrared camera placed on a tank.

7 Claims, 5 Drawing Figures

APPARATUS FOR DETECTION OF AN ENEMY'S INFRARED CAMERA

BACKGROUND OF THE INVENTION

This invention is related to an apparatus for detecting an enemy's infrared camera.

We know that such a camera includes a periodical line scanning system of the infrared energy situated in a particular sector of space, a convergent optical system capable of concentrating the infrared energy scanned by the scanning system, an infrared electronic detector placed in such a way that it can receive the energy concentrated by the optical system, and a visualising system connected to the scanning system and to the electrical output of the detector to form the thermal picture of the sector, on a screen.

An apparatus to detect such a camera has been proposed, which includes:

- a laser generating an infrared beam,
- an orientable reflector to direct the infrared beam to the camera, the optical system of the camera then sending infrared signals to the reflector,
- an infrared electro-optical receiver positioned to receive the said infrared signals reflected by the reflector, the receiver including a first and a second electrical output, the receiver supplying on its first output, reception electrical signals showing the intensity of the infrared signals and supplying on its second output, vertical reference electrical signals showing the discrepancy between a reference point on the sensitive area of the receiver and the receiving points on this surface of the infrared signals,
- a servo-control system connected to the second electrical output of the receiver which receives the vertical reference electrical signals, this system being able to control the positioning of the reflector so as to reduce the said discrepancy,
- an electro-optical range-finder,
- and means to position the range-finder towards the camera, these means being connected to the reflector positioning servo-control system, the range-finder being able to indicate periodically the distance from the camera, a first spot being formed on the screen of the camera every time the scanning system directs to the detector the energy of the infrared laser beam concentrated by the optical system, the latter sending back to the apparatus, by catadioptric effect, an infrared signal constituted by part of this concentrated energy, the receiver supplying in return a reception electrical signal on its first electrical ouput.

However, the proposed apparatus cannot be used in practice because the enemy can immediately spot the detection apparatus thanks to the spots formed on the screen of his camera, and it is then easy for him to aim a weapon in the direction of the detection apparatus.

SUMMARY OF THE INVENTION

The purpose of this invention is to make an apparatus to detect an enemy's infrared camera without the enemy being able to detect this apparatus.

It concerns an apparatus of the above specified type, characterised by the fact that it also includes:

- a processing circuit connected to the range-finder to receive the indication of the camera distance and connected to the first electrical output of the receiver to measure the time intervals between the reception electrical signals, in order to determine the line rate and the picture rate of the camera scanning system, this processing circuit being able to determine a delay time on the basis of the camera distance and these rates,
- a delay circuit, connected to the processing circuit to supply, at the same speed as the picture rate, a control electrical signal delayed by the said delay time in relation to the reception signal,
- and means to emit a laser pulse towards the reflector, in parallel with the emitting axis of the laser generator, these means being connected to the delay circuit so that a pulse is emitted each time a control electrical signal is emitted, this laser pulse being reflected towards the camera by the reflector and appearing on the camera screen as a second very bright spot, the delay time determined by the processing circuit being higher than a minimum value and lower than a maximum value, the minimum value being determined so that the second spot represents a picture of a dummy object which is further away from the apparatus than a pre-set distance, the maximum value being determined so that the second spot creates a dazzling effect on the screen, this dazzling being strong enough so that the first spot is no longer visible.

BRIEF DESCRIPTION OF THE DRAWINGS

Some particular aspects of the implementation of this invention are described below, as examples, with reference to the attached drawings, in which:

FIG. 5 is an illustration of an alternative arrangement of the delay means in FIG. 1.

DETAILED DESCRIPTION OF THE INVENTION

Figure 1:
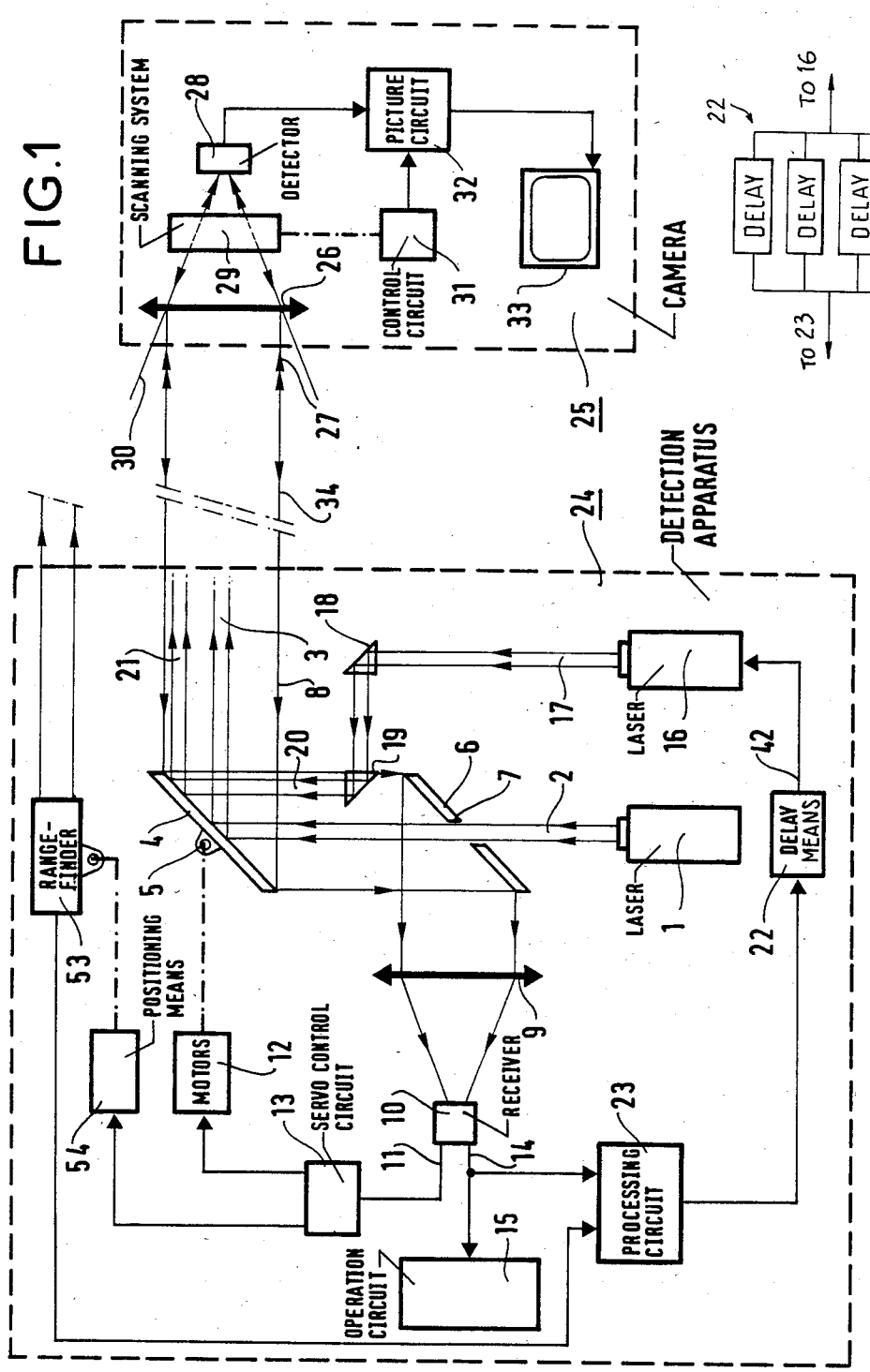
FIG. 1 represents schematically an implementation mode of the apparatus according to the invention.

FIG. 1 shows a continuous laser generator 1 of an infrared beam 2 which is reflected according to a beam 3 on a plane mirror 4, which can be oriented on a ball-and-socket joint 5. Another plane mirror 6 with a central opening 7 is placed between laser generator 1 and mirror 4 so that beam 2 goes through opening 7. Orientable mirror 4 receives in return an infrared beam 8 parallel to beam 3, but directed in the opposite direction. Beam 8 is successively reflected on mirrors 4 and 6 which direct it to the sensitive area of an electro-optical infrared receiver 10 through a concentration optical system 9. Receiver 10 includes an electrical output 11 connected to motors 12 through a servo-control circuit 13. Motors 12 are linked mechanically to mirror 4, in order to orient it on ball-and-socket joint 5. Receiver 10 includes another electrical output 14 connected to an operation circuit 15. A laser generator 16, of the pulsed type, emits an infrared beam 17, which is reflected successively on 2 prisms 18 and 19, in order to form a beam 20, parallel to beam 2 and reflected on mirror 4 according to a beam 21 parallel to beam 3. Laser generator 16 is connected electrically to the output of a delay circuit 22, connected to electrical output 14 of receiver 10 through a processing circuit 23. A laser range-finder 53 is mechanically linked to orienting means 54 of this range-finder, these being connected to servo-control circuit 13. The electrical output of range-finder 53 is connected to processing circuit 23. These various elements constitute a detection apparatus 24.

FIG. 1 also shows an infrared camera 25 detected by apparatus 24. Camera 25 includes a convergent optical system 26 able to concentrate a beam 27 on the sensitive surface of an electro-optical infrared detector 28. Between optical system 26 and detector 28, there is a periodical line scanning system 29 of a sector of space 30. Scanning system 29, which is of a similar type to that of a TV camera and can include for example 2 optical elements which can be moved in relation to each other, is connected to a circuit 31. Camera 25 also includes a picture creation circuit 32 which has two inputs connected respectively to circuit 31 and to the electrical output of detector 28. The output of circuit 32 is connected to a visualising system 33 fitted with a screen.

Detection apparatus 24 previously described and illustrated by FIG. 1 works in the following manner:

At the beginning, motors 12 are supplied by an acquisition circuit not shown on the figure, this circuit allowing the control of the positioning of mirror 4 so that beam 3 searches systematically the surrounding space. As soon as beam 3 hits the infrared camera 25, its optical system 26 sends back in the opposite direction, by a catadioptric effect, a very bright beam with a low divergence. This beam 8 is received on mirror 4 and, after it has been successively reflected on mirrors 4 and 6 and has been through optical system 9, is concentrated on the sensitive surface of receiver 10. As soon as such a return infrared beam is received by receiver 10, the acquisition circuit is disconnected from motors 12, these then being connected to servo-control circuit 13 as shown on FIG. 1. Output 11 of receiver 10, which can for example be of the four quadrant type, sends a vertical reference signal of which the amplitude represents the discrepancy between a reference point on the sensitive surface of receiver 10 and the reception point on this surface of the return beam. Servo-control circuit 13 controls the positioning of mirror 4 in order to reduce this discrepancy. Beam 3 therefore remains permanently directed to camera 25. Moveover, servo-control circuit 13 controls positioning means 54 in order to direct the emitting axis of range-finder 53 in parallel with the beam. Range-finder 53 supplies periodically the indication of camera distance on its electrical output.

Figure 3:
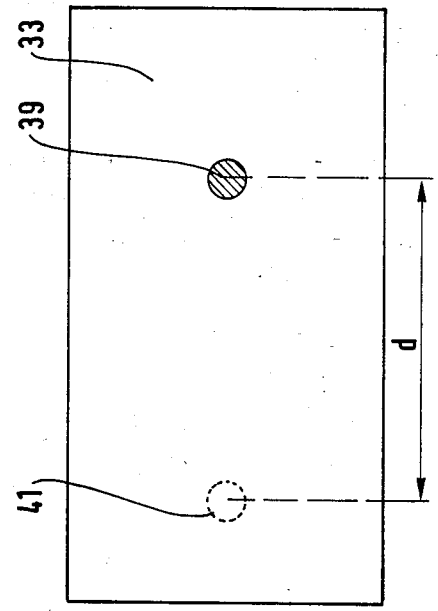
FIG. 3 is a schematic view of the picture which appears on the screen of a camera detected by the apparatus illustrated in FIG. 1.

Optical system 26 of camera 25 concentrates beam 27 (shown by two-feathered arrows) which comes from laser generator 1, in the plane of the sensitive surface of detector 28. Each time the scanning system of the camera directs this concentrated energy to the detector, a spot 41 is created on the screen of the camera, (see FIG. 3) and optical system 26 sends back to apparatus 24, by catadioptric effect, an infrared signal 34 (shown by single-feathered arrows) made by a part of this concentrated energy. Return beam 8 directed to receiver 10 is therefore formed by a sequence of infrared signals.

Figure 2:
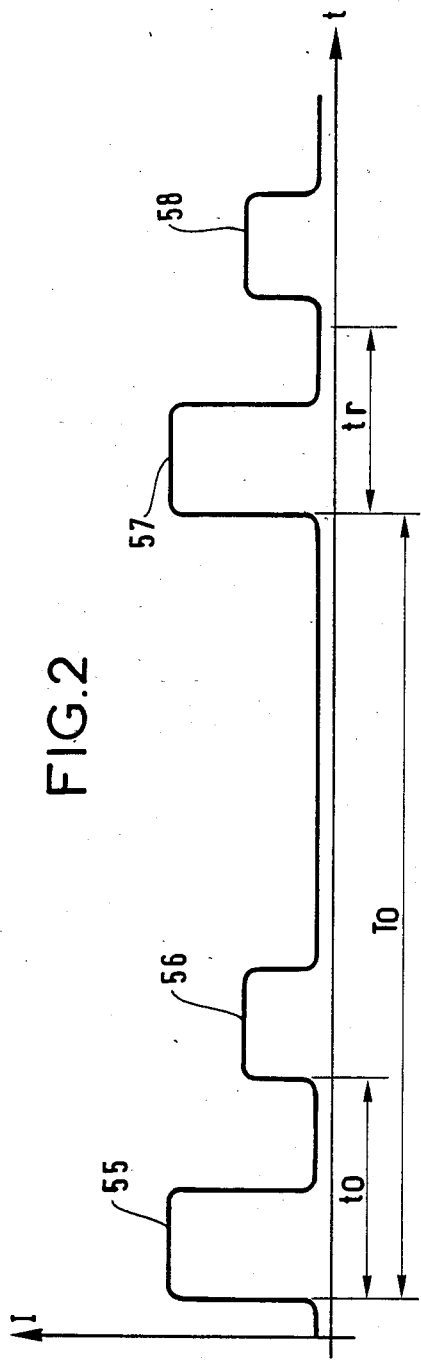
FIG. 2 is a diagram of the pulses illustrating the operation of the apparatus represented in FIG. 1.

FIG. 2 shows such a sequence in case the camera detector includes several groups of cells. Each infrared signal then includes a series of infrared pulses of which the envelope makes a rectangle shaped signal.

FIG. 2 is related to 2 rectangle-shaped co-ordinate axis, the x-axis on which the time t is displayed and the y-axis on which the intensity I of the signals is indicated. We have assumed that only 2 consecutive scanning lines go in the laser energy concentration zone at each creation of a picture. The first through this zone produces a signal 55 and the second a signal 56, these signals being rectangle-shaped. Signal 55, which has a greater amplitude, corresponds roughly to the scanning of the middle point of the concentration zone, while signal 56, of a lesser amplitude, corresponds to the scanning of the peripheral part of this zone.

The time interval $t_o$ between the leading edges of signals 55 and 56 is equal to the duration of the creation of scanning lines. Two signals identical to 55 and 56 appear in 57 and 58 when the scanning system creates the next picture. The time interval $T_o$ between the leading edges of great amplitude signals 55 and 57 is equal to the period of creation of scanning pictures.

Receiver 10 supplies electrical signals representing the infrared signals it receives on its output 14. These electrical signals are transmitted to operation circuit 15 which in return controls for example, artillery fire in the direction of the camera. These electrical signals are also transmitted to processing circuit 23 which also receives, constantly, the indication of the camera distance measured by range-finder 53. Processing circuit 23 measures the periods $t_o$ to $T_o$ and from these deducts the corresponding rates of the lines and pictures produced by the camera scanning. Processing circuit 23, which has in its memory some characteristics of the elements of the apparatus (such as the power of laser generators 1 and 16) is also capable of calculating a delay time $t_d$ in a manner which will be explained later on.

Delay circuit 22 supplies, at its output, a control electrical signal delayed by time $t_d$ in relation to the leading edge of the second great magnitude electrical signal 57. As soon as the control electrical signal is activated, pulsed laser generator 16 emits a strong pulse on the same wavelength as that of the infrared radiation emitted by laser generator 1. This pulse is emitted at a rate which corresponds to the period of picture creation by the camera. After it has been reflected on prisms 18-19 and on mirror 4, and after it has been through optical system 26 of the camera, this pulse is directed by scanning system 29 to detector 28 with a delay equal to $t_d$ increased by the light transmission time from the apparatus to the camera. As can be seen on FIG. 3 this pulse appears on VDU 33 as a second spot 39 shifted by a distance d in relation to first spot 41 corresponding to the laser energy emitted by laser generator 1. The luminosity of spot 39 is such that it causes a dazzling effect on the screen of device 33, so that spot 41 (shown in dashes) is no longer visible on this screen. In practice, spot 41 does not appear on the screen because it disappears after the second image created by the scanning system. The enemy therefore only sees new spot 39 which is the picture of a dummy object situated at a distance D from the detection apparatus. The enemy then aims its artillery in the wrong direction, the detection apparatus and surrounding military equipment are thus safe.

The delay time $t_d$ determined by the processing circuit must be sufficiently long for distance D to be enough to protect in effect, the detection apparatus against reaction from the enemy's artillery. Circuit 23 therefore computes first a minimum value for this delay time in order to fulfill this condition.

Also, the delay time $t_d$ must be sufficiently short for the second spot to cause in practice a dazzling effect on the camera screen. Circuit 23 therefore computes a maximum value for the delay time in order to fulfill this new condition.

When these minimum and maximum values (adjusted to take into account the light transmission time) are lower than the time of line creation by the camera, circuit 23 can determine a time $t_d$ equal for example to the arithmetic average between the maximum and minimum values.

In a second realisation mode of the apparatus according to the invention, continuous laser generator 1 can be replaced by a laser generator emitting pulses at a high repetition rate, eg. 30 KHz approx. This has the advantage of making a greater power available and of increasing the range of the apparatus.

In the third realisation mode of the apparatus according to the invention, pulsed laser generator 16 and prisms 18 and 19 (see FIG. 1) are eliminated and output 42 of delay circuit 22 is connected directly to an activating system connected to laser 1. Thanks to this activating circuit, continuous laser generator 1 is able to emit pulses following the same route 2, 3 as the continuous beam. This gives a more simple apparatus which includes only one laser.

Figure 4:
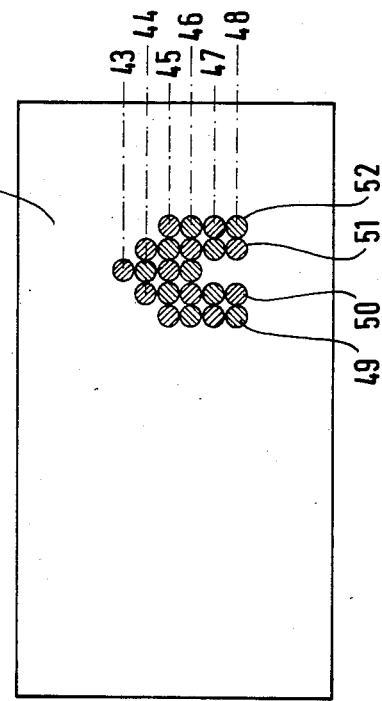
FIG. 4 is a schematic view of the picture which appears on the screen of a camera detected by an alternative version of the apparatus represented in FIG. 1.

In a fourth realisation mode of the apparatus according to the invention, delay circuit 22 includes the means to supply several control electrical signals, as shown in FIG. 5, the various signals being respectively delayed in relation to each electrical signal supplied by receiver 10, by several different time intervals so that laser generator 16 emits, for each picture formed, several laser pulses. The delays are computed by processing circuit 23 so that the various spots are situated on the various scanning lines of one same picture. This way, a picture of a dummy object is formed of several spots, on screen 33 of the camera. FIG. 4 represents an example of such a picture. On this figure, all the spots of the picture are positioned on various scanning lines 43 to 48. On each line, such as 48, several spots can be placed, such as 49 to 52. In the example given, these spots make up roughly the picture of a house. This picture is shifted in relation to the spot made up by the beam emitted by laser generator 1. The creation of the picture of the dummy object on the screen of the camera induces the enemy to shoot in the direction of this picture, the detection apparatus (and the military installation next to it, if any) is therefore kept safe.

It is also possible to use variable delay times. A mobile false picture is therefore formed in order to disturb the enemy's automatic aiming system.

The detection apparatus according to the invention can be used to detect an enemy's infrared camera placed on a tank. This detection is made without revealing the position of the detection apparatus to the enemy. It goes together with the creation, on the visualising screen of the detected camera, of a picture of a dummy object made up of one or several spots. This pisture is shifted in relation to the direction of the detection apparatus, so that the enemy is induced to aim its artillery fire in the wrong direction.

We claim:

1. An apparatus for the detection of an enemy infrared camera, said camera including a periodical line scanning system of the infrared energy situated in a particular sector, a convergent optical system for concentrating the infrared energy scanned by the scanning system, an electro-optical infrared detector positioned to received the energy concentrated by the optical system and a visualising system connected to the scanning system and to the electrical output of the detector for forming a thermal image of the section on a screen, said apparatus including: an infrared beam laser generator for generating an infrared beam; an orientable reflector positioned for directing the infrared beam to said camera and for reflecting infrared signals sent back to said reflector by said camera optical system; an infrared electro-optical receiver means for receiving the infrared signals reflected by said reflector, said receiver means including first and second electrical outputs and supplying, in its first output, reception electrical signals representing the intensity of the received infrared signals and supplying, on its second output, vertical reference electrical signals representing the discrepancy between a reference point on the sensitive surface of said receiver means and the reception points of the infrared signals on said surface; a servo-control system means connected to the second electrical output of said receiver means for receiving the vertical reference electrical signals, said servo-control system means controlling the positioning of the reflector in order to reduce said discrepancy; an electro-optical range-finder means for periodically providing an output indicating of the distance of said camera; positioning means coupled to said servo-control system means for positioning said range-finder means with respect to said camera; a first spot being created on the camera screen each time the scanning system directs to said detector the infrared laser energy which has been concentrated by the optical system, said optical system sending back to said apparatus, by a catadioptric effect, an infrared signal made of part of this concentrated energy, the receiver means supplying in return a reception electrical signal on its first electrical output, said apparatus further comprising:

pulse means responsive to a control electrical signal for emitting a laser pulse towards said reflector in parallel with an emitting axis of said laser generator for reflection by said reflector toward said camera to appear on the camera screen as a very bright second spot;

a processing circuit means, responsive to said range-finder means output and to said first electrical output of said receiver means, for measuring the time intervals between reception electrical signals, determining the line rate and the picture rate of said camera scanning system in accordance with said measured time intervals, said processing circuit means includig means for determining, in accordance with said range-finder means output and in accordance with the line and picture rates, a delay time greater than a minimum value representing a minimum acceptable displacement between said first spot and said second spot on said camera screen such that said second spot will represent a picture of a dummy object displaced by a predetermined minimum distance from said apparatus, and a maximum value representing the maximum desirable displacement between said second spot and said first spot such that said second spot will cause a dazzling effect on said camera screen to render said first spot no longer visible; and delay means coupled to said processing circuit means for supplying, at said picture rate, said control electrical signal delayed by said delay time with respect to said reception signal.

2. An apparatus according to claim 1, wherein said pulse means comprises said infrared beam laser generator and means for activating said laser generator for emitting said laser pulse.

3. An apparatus accordig to claim 1, wherein one of said processing circuit means and delay means includes means for varying the delay of said control electrical signal to provide a moving false image on said camera screen.

4. An apparatus according to claim 1, further characterized in that:
   said delay means comprises a plurality of delay circuits coupled to said processing circuit means for supplying a plurality of control electrical signals delayed by respective amounts with respect to said reception signal;
   said pulse means is coupled to said plurality of delay circuits for emitting, at the camera picture creation rate, a laser pulse each time a control electrical signal is supplied from a different one of said delay circuits; and
   said processing circuit means including means for determining the various delays so that the picture appearing on the screen of said camera includes several spots representing a dummy object.

5. An apparatus according to claim 1, wherein said infrared beam emitted by said laser generator is continuous beam.

6. An apparatus according to claim 1, wherein said infrared beam emitted by said laser generator comprises a series of laser pulses.

7. An apparatus according to claim 1, wherein said delay time comprises an arithmetic average between said minimum and maximum values.

* * * * *